W. E. BRIGGS.
AUTOMOBILE POWER ATTACHMENT.
APPLICATION FILED NOV. 18, 1920.

1,373,295. Patented Mar. 29, 1921.

Inventor
William E. Briggs
By Geo. P. Kimmel
Attorney

UNITED STATES PATENT OFFICE.

WILLIAM E. BRIGGS, OF DAVISON, MICHIGAN.

AUTOMOBILE POWER ATTACHMENT.

1,373,295.   Specification of Letters Patent.   Patented Mar. 29, 1921.

Application filed November 18, 1920. Serial No. 424,873.

*To all whom it may concern:*

Be it known that I, WILLIAM E. BRIGGS, a citizen of the United States, residing at Davison, in the county of Genesee and State of Michigan, have invented certain new and useful Improvements in Automobile Power Attachments, of which the following is a specification.

The improved device includes an improved device for attachment to one of the drive wheels of a motor driven vehicle, the wheel hub being represented at 10, the spokes at 11 and the rim at 12.

In operating the device, the rear or driven axle will be elevated by suitable jacks, one of which is represented conventionally at 13, to raise the rear wheels free from the ground represented at 14.

The wheel attachment comprises coacting plates 15 and 16 connected to opposite sides of an adjacent pair of the spokes 11, by clamp bolts 17. Any required number of the bolts may be employed, but generally 4 will be used as shown.

The plates 15—16 are centrally apertured to receive a relatively large stud member, represented as a whole at 18, provided with a stop collar 19 bearing against the plate 16 and reduced at 20 to pass through the aperture in the plate 15 and secured in place by a nut 21.

The outer end 22 of the stud forms a crank pin engaged by the perforated end of a connecting rod 23.

For the purpose of illustration, the improved transmitting device is shown coupled to the handle member 24 of a conventional pump, represented at 25, by a clip device 26. The direct coupling member which is applied to the clip 26 is a section of tubing or piping 27 in which the outer end of the rod 23 is slidably received and adjustably coupled thereto by set screws 28.

By this simple means the power of the motor of the automobile may be effectually utilized for driving any kind of machinery within the range of the ability of the motor, and without structural change in the automobile or the machinery to which it is applied.

This invention relates to an apparatus for transmitting power from the engine of a motor driven vehicle, for operating various kinds of machines, such as pumps, fanning mills, feed mills, sawing machines and the like, and has for one of its objects to simplify and improve the construction and increase the efficiency of devices of this character.

Another object of the invention is to provide a device of this character having improved means for coupling the power transmitting elements to one of the drive wheels of the vehicle.

Another object of the invention is to provide a device of this character having means whereby the power transmitting elements may be adjusted to adapt the device to different kinds and sizes of machinery to be driven.

With these and other objects in view, the invention consists in certain novel features of construction as hereinafter shown and described and then specifically pointed out in the claim, and in the drawings illustrative of the preferred embodiment of the invention.

Figure 1:
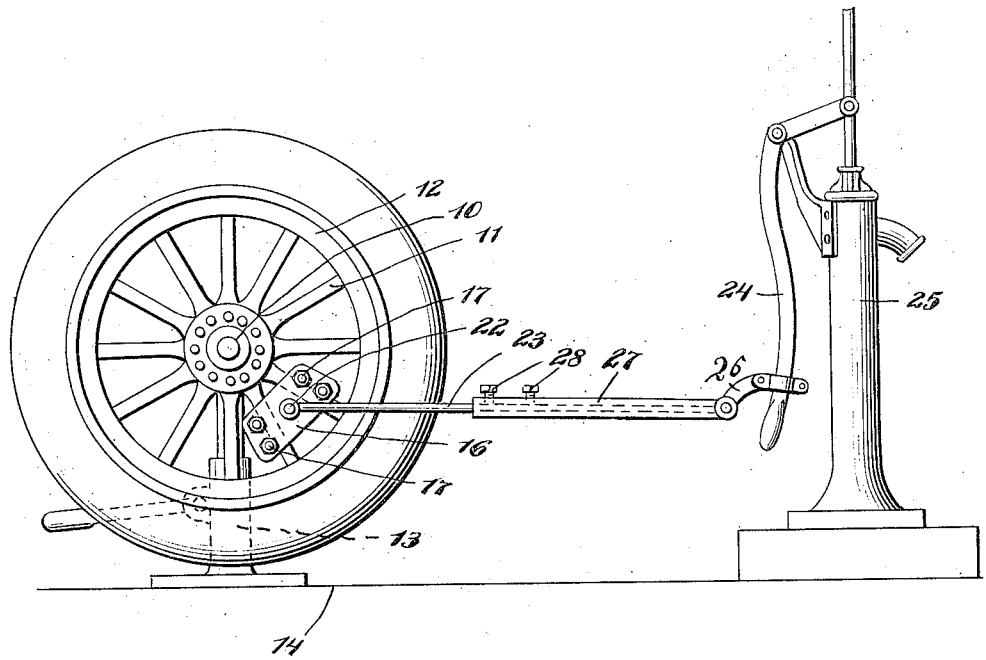
Figure 1 is a side elevation of a portion of an automobile and a conventional pump, with the improved transmitting devices applied.
Figure 2:
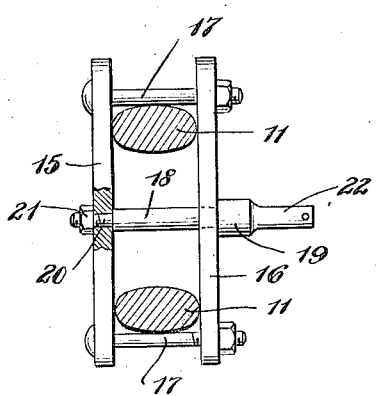
Fig. 2 is an enlarged sectional detail illustrating the construction of the means for coupling the transmitting elements to the motor drive wheel.

The preferred embodiment of the invention is disclosed in the drawings and set forth in the specifications, but it will be understood that any modifications within the scope of the claim may be made in the construction without departing from the principle of the invention or sacrificing any of its advantages.

I claim:

A device of the class described comprising clamp plates without bend or curvature from end to end and having alined apertures intermediate the ends and outer apertures near the ends, said plates adapted to bear upon opposite faces of contiguous spokes of one of the wheels of a vehicle, clamp bolts extending through the outer apertures and connecting said plates externally of the spokes and serving to prevent lateral displacement of the plates, a stud engaging through said intermediate apertures and having a stop shoulder intermediate the ends to bear against one of the plates, means for applying strain to said outer clamp bolts longitudinally thereof to compress the plates against the spokes, and a connecting element swingingly coupled at one end to said stud and adapted to be coupled at the other end to a movable part of a machine.

In testimony whereof I affix my signature hereto.

WILLIAM E. BRIGGS.